(12) United States Patent
Yuhara et al.

(10) Patent No.: US 10,343,800 B2
(45) Date of Patent: Jul. 9, 2019

(54) ULTRASONIC SEALING APPARATUS

(71) Applicant: TOPPAN PRINTING CO., LTD., Tokyo (JP)

(72) Inventors: Noritaka Yuhara, Tokyo (JP); Yuichiro Yasuda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/880,177

(22) Filed: Jan. 25, 2018

(65) Prior Publication Data

US 2018/0148207 A1    May 31, 2018

Related U.S. Application Data

(63) Continuation of application No. PCT/JP2016/071121, filed on Jul. 19, 2016.

(30) Foreign Application Priority Data

Jul. 30, 2015   (JP) ................... 2015-150659

(51) Int. Cl.
*B32B 37/00*   (2006.01)
*B65B 51/22*   (2006.01)
(Continued)

(52) U.S. Cl.
CPC ............ *B65B 51/225* (2013.01); *B29C 65/08* (2013.01); *B29C 65/086* (2013.01); *B29C 65/7451* (2013.01); *B29C 66/1122* (2013.01); *B29C 66/346* (2013.01); *B29C 66/432* (2013.01); *B29C 66/4312* (2013.01); *B29C 66/72328* (2013.01); *B29C 66/7373* (2013.01); *B29C 66/73921* (2013.01); *B29C 66/8145* (2013.01); *B29C 66/81427* (2013.01);
(Continued)

(58) Field of Classification Search
CPC ..... B29C 65/08; B29C 6/086; B29C 65/7451; B29C 66/1122; B29C 66/346; B29C 66/4312; B29C 66/432; B29C 66/81427; B29C 66/81431; B29C 65/086; B65B 51/225
USPC ............................................. 156/498, 580.1
See application file for complete search history.

(56) References Cited

U.S. PATENT DOCUMENTS

| 4,426,244 A * | 1/1984 | Wang | ..................... D04H 1/555 156/498 |
| 6,482,291 B1 * | 11/2002 | Kume | ..................... B29C 65/08 156/553 |
| 2006/0225842 A1 * | 10/2006 | Darcy, III | ............... B29C 65/08 156/580.1 |

FOREIGN PATENT DOCUMENTS

| JP | 04-044935 A | 2/1992 |
| JP | 04-253621 A | 9/1992 |

(Continued)

OTHER PUBLICATIONS

International Search Report issued in International Patent Application No. PCT/JP2016/071121 dated Oct. 4, 2016.

*Primary Examiner* — James D Sells
(74) *Attorney, Agent, or Firm* — Foley & Lardner LLP

(57) ABSTRACT

An ultrasonic sealing apparatus for paper packages achieves more stable ultrasonic sealing by cooling the horn during ultrasonic sealing which would otherwise be unstable due to heat imparted to a horn by continuous sealing. An end portion of a horn of a casing that includes the horn and a converter, or the horn, a booster and the converter is cooled by supplying air to a frame portion exposed toward an anvil side.

5 Claims, 4 Drawing Sheets

(51) Int. Cl.
   *B29C 65/08*      (2006.01)
   *B29C 65/00*      (2006.01)
   *B65B 51/30*      (2006.01)
   *B29C 65/74*      (2006.01)
   *B29L 31/00*      (2006.01)

(52) U.S. Cl.
   CPC .. *B29C 66/81431* (2013.01); *B29C 66/81812* (2013.01); *B29C 66/8491* (2013.01); *B65B 51/303* (2013.01); *B29C 66/81419* (2013.01); *B29C 66/81425* (2013.01); *B29L 2031/712* (2013.01); *B29L 2031/7166* (2013.01)

(56) References Cited

FOREIGN PATENT DOCUMENTS

| | | |
|---|---|---|
| JP | 06-008330 A | 1/1994 |
| JP | 4025098 B2 | 12/2007 |
| JP | 4603122 B2 | 12/2010 |

\* cited by examiner

ULTRASONIC SEALING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/071121, filed on Jul. 19, 2016, which is based upon and claims the benefit of priority of Japanese Patent Application No. 2015-150659, filed on Jul. 30, 2015, the entireties of which are hereby incorporated by reference.

TECHNICAL FIELD

The present invention relates to a technique for ultrasonic sealing of overlapped portion of a paper container for liquids.

BACKGROUND ART

Paper containers for liquids are widely used for fruit beverages, liquid beverages such as tea, coffee, milk beverages, soup, and alcoholic beverages such as sake and shochu. Examples of the shape of such a container include a gable top shape, a brick shape and a cylindrical shape.

For example, in manufacturing a brick-shape paper container for liquids, scores for forming the container are applied to a packaging material formed of a paper layer with a thermoplastic resin layers being provided on the front and back surfaces thereof, and an edge protection tape is applied to the end portions of the packaging material. Then, the packaging material is formed into a tubular shape, and the longitudinal end portions of the packaging material are overlapped and bonded to each other, thereby forming a packaging material having a tubular shape. Subsequently, the lower end portion of the tubular packaging material is sealed in the transverse direction, and then subjected to submerged sealing for sectioning in the state of being filled with liquid contents, followed by forming into a three-dimensional shape, thereby providing a paper container.

To seal the packaging material in the transverse direction, the packaging material is pressed and vibrated by a horn (vibrating side) attached to a converter (ultrasonic oscillator) that converts electric energy into mechanical vibration energy and an anvil (vibration receiving side), to melt the thermoplastic resin layers on the surfaces of the packaging material with heat generated at the package material interface (see PTLs 1 and 2).

Known documents are shown below.

CITATION LIST

Patent Literature

PTL 1: JP-4025098 B; PTL 2: JP-4603122 B

SUMMARY OF THE INVENTION

Technical Problem

Continuous ultrasonic sealing of a paper container using an ultrasonic sealing apparatus may impart heat to the vibrating horn, and may cause unstable ultrasonic sealing.

The present invention has been made in view of the above circumstances, and an object thereof is to achieve more stable ultrasonic sealing by cooling the horn.

Solution to Problem

An aspect of the present invention that solves the above problem is an ultrasonic sealing apparatus for sealing an overlapped portion by pressing a horn and an anvil against the overlapped portion from both sides, the overlapped portion being a portion where surfaces of a packaging material are so overlapped that the thermoplastic resin layers face each other, characterized in that the apparatus includes the horn, the anvil and a frame portion, the horn is ultrasonically vibrated, the anvil presses the packaging material interposed between the horn and the anvil, and the frame portion has a mechanism of blowing a fluid to an end portion of the horn.

Advantageous Effects of Invention

According to an aspect of the present invention, the horn is cooled with a fluid (for example, compressed air) blown from the frame portion to the end portion of the vibrating horn.

As a result, according to the aspect of the present invention, more stable sealing is achieved by the use of ultrasonic vibrations.

When the surface of the end portion of the horn has water repellency, the water repellency, being synergistically coupled with the fluid blown from the frame portion, can actively remove the liquid contents and the like adhered to the end portion of the horn.

DESCRIPTION OF THE REPRESENTATIVE EMBODIMENTS

Embodiments of the present invention will be described below. It will be understood that the embodiments described below are intended to be representative of the present invention. The present invention is not necessarily limited to these representative embodiments.

Figure 3:
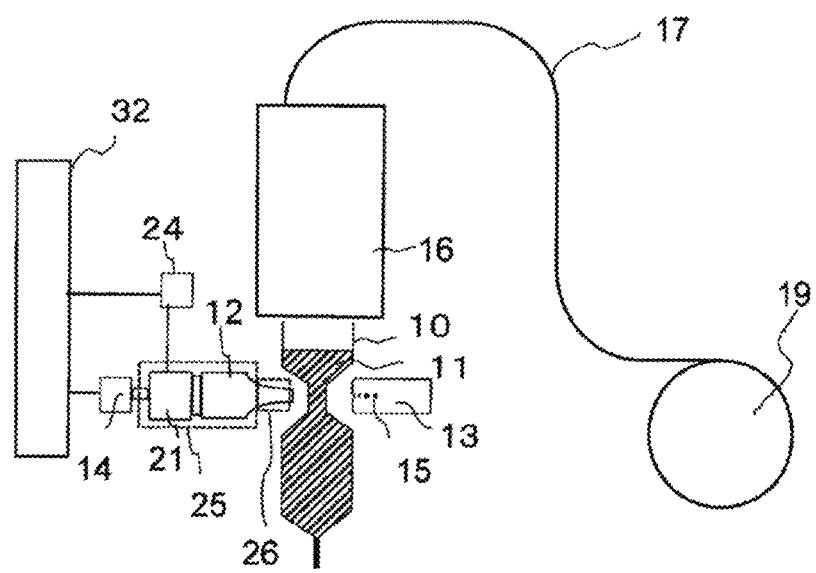
FIG. 3 is a schematic view illustrating a manufacturing process of a paper container for liquids and an apparatus of the present invention.

FIG. 3 is a schematic view illustrating a manufacturing process of a brick-shape paper container for liquids, and a sealing portion of an apparatus of the present invention.

As shown in FIG. 3, a raw material 19 that has been rolled being provided with a ruled line for forming a container, is unrolled as a sheet-like packaging material 17. The sheet-like packaging material 17 is formed into a tubular shape in a processing section 16 by overlapping and bonding the end portions thereof with each other, and applying an edge protection tape to the overlapped portion so as to cover the inner end portion in the overlapped portion, for longitudinally sealing. The processing section 16 includes a shaping section (longitudinal sealing section) for shaping the sheet-like packaging material 17 into a tubular shape, and a liquid contents filling section.

Figure 1:
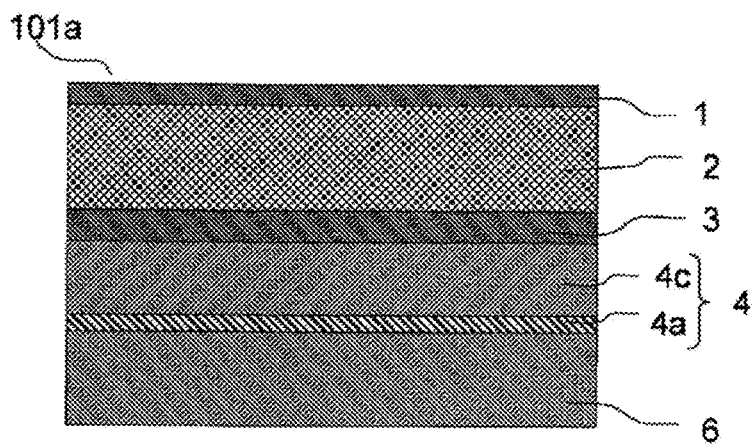
FIG. 1 is a schematic cross-sectional view of a laminate used as an example of an ultrasonic sealing apparatus according to an embodiment of the present invention.
Figure 2:
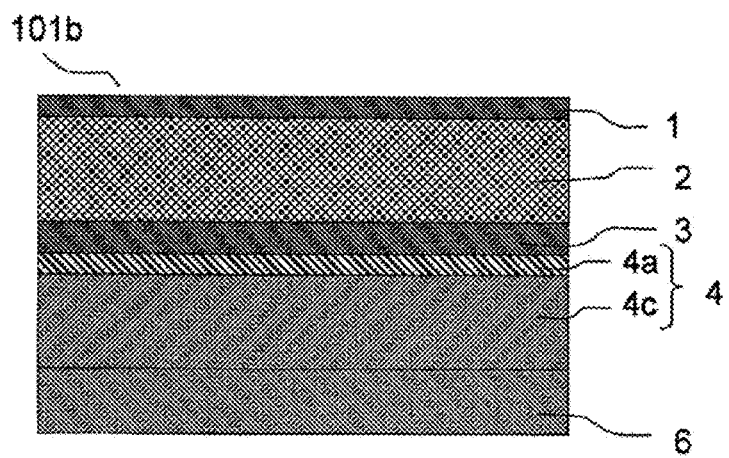
FIG. 2 is a schematic cross-sectional view of a laminate used for an example of an ultrasonic sealing apparatus according to an embodiment of the present invention.

For the packaging material used here, a laminate 101a or 101b having the configuration shown in FIGS. 1 and 2 is used, for example. In each of the laminates, an outermost layer and an innermost layer are made of a thermoplastic resin layer 1 and a thermoplastic resin layer 6, respectively. The thermoplastic resin layers 1, 6 are made such as of polyethylene. For an adhesive resin layer 3, polyethylene is used, for example. Reference sign 2 indicates a paper base material. The thermoplastic resin layers 1, 6 and the adhesive resin layer 3 may be made of other materials. A barrier layer 4 shown in FIGS. 1 and 2 is formed of a substrate film 4c including a vapor deposition film layer 4a. The substrate film 4c is made such as of polyethylene terephthalate. The barrier layer 4 may be made of aluminum or another barrier material.

In the barrier layer 4 shown in FIG. 1, the vapor deposited film layer 4a is on an inner side. In the barrier layer 4 shown in FIG. 2, the vapor deposited film layer 4a is on an outer side. Further, the configuration of the laminate constituting the packaging material is not limited only to the configurations shown in FIGS. 1 and 2. The materials used for the layers of the laminate constituting the packaging material are not limited to the above materials. As mentioned above, the barrier layer 4 may be made of aluminum.

Figure 4:
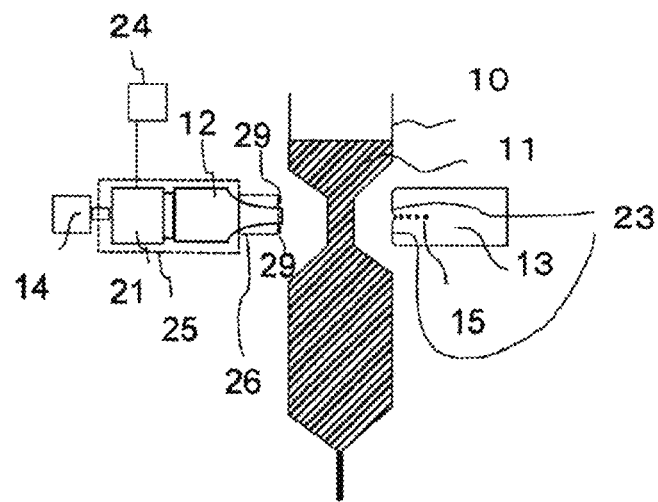
FIG. 4 is a view illustrating a method and an apparatus for ultrasonic sealing according to an embodiment of the present invention.

With reference to FIG. 4, a laterally sealing process will be described.

In the process described above, the packaging material 17 has been formed into a tubular shape with the liquid contents being contained therein. This tubular packaging material 17 is lifted down to pass through an ultrasonic sealing section. During the passage, the overlapped portion where surfaces of the packaging material are overlapped for the thermoplastic resin layer thereof to face each other, is sealed while being pressed by a horn 12 and an anvil 13 from both sides in the thickness direction of the laminates.

That is, ultrasonic vibrations are applied to the horn 12 when a converter 21 is oscillated with the activation of an ultrasonic generator 24. The vibrating horn 12 welds the surfaces of the pressed packaging material. The horn 12 presses the packaging material with a cam mechanism, an oil-hydraulic cylinder, or a pneumatic cylinder, constituting a pressing mechanism section 14. The pressing is performed with the activation of solenoid valve, and the force is pneumatically adjusted. The anvil 13 has a pair of vertically symmetrical sealing bars 23. The pair of sealing bars 23 weld an upper portion and a lower portion of the packaging material by cooperating with the vibrating horn 12, and then, the packaging material is cut between the welded upper and lower portions by using a cutting blade 15. Thus, a paper container containing liquid contents is formed. The ultrasonic vibration generator having the converter 21 and the horn 12 is covered with a casing 25.

Figure 5:
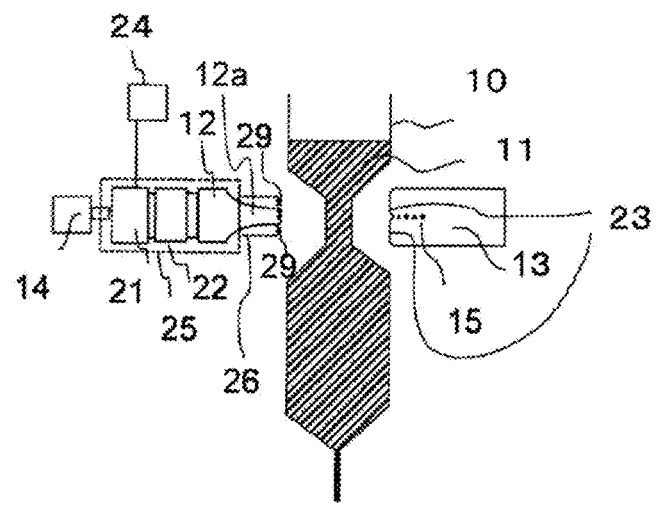
FIG. 5 is a view illustrating a method and an apparatus for ultrasonic sealing according to an embodiment of the present invention.

FIG. 5 shows another embodiment, in which the ultrasonic vibration generator including a converter 21, a booster 22 and a horn 12 is accommodated in the casing 25.

Figure 6:
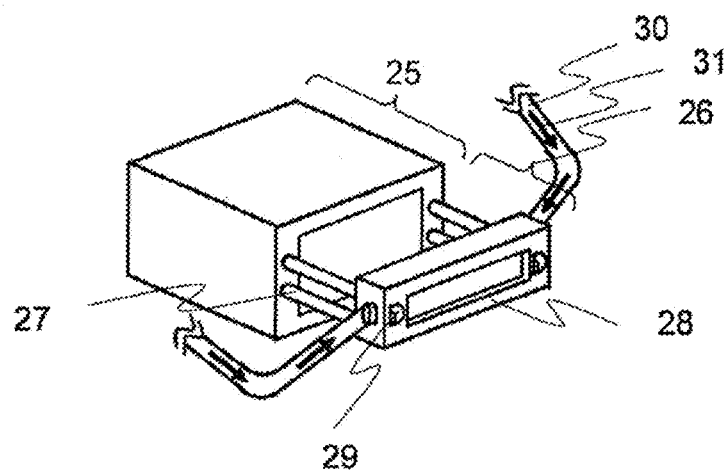
FIG. 6 is a schematic perspective view illustrating the appearance of an ultrasonic vibration generator casing in an ultrasonic sealing apparatus according to an embodiment of the present invention.

FIG. 6 shows an example of the casing 25 and a frame portion 26 of the ultrasonic vibration generator according to the present embodiment. When the ultrasonic vibration generator includes the converter 21 and the horn 12 as shown in FIG. 4, the casing 25 stores the converter 21 and part of the horn 12. When the ultrasonic vibration generator includes the converter 21, the booster 22 and the horn 12 as shown in FIG. 5, the casing 25 stores the converter 21, the booster 22 and part of the horn 12. Part of the horn 12 refers to the body of the horn 12, and the body is integrally formed with an end portion 12a of the horn 12.

The frame portion 26 is around the periphery of the end portion of the horn 12.

The frame portion 26 includes an end frame 28 and rod-like members 27.

The end frame 28 is an endless annular and hollow frame provided at around the periphery of the end portion 12a of the horn 12 so as to face the end portion of the end portion 12a throughout the periphery thereof. The rod-like members 27 connect the end frame 28 to the casing 25, and are formed of shafts or the like. The ultrasonic sealing apparatus of the present embodiment is provided with a fluid supply pipe 30 for supplying air 31 into the end frame 28, and blows the air 31 for cooling the horn 12. The end frame 28 has an inner surface in which an opening 28a that is a hole or a slit is provided. From this opening 28a, the air 31 is blown toward the end portion 12a of the horn 12. The air 31 is fed to the fluid supply pipe 30 by a compressor or the like (not shown).

The hollow end frame 28 and the opening 28a are configured to blow the air. The air 31 has a normal temperature; however, it may be cooled by a heat exchanger or the like and then separately supplied to the end frame 28.

Figure 7:
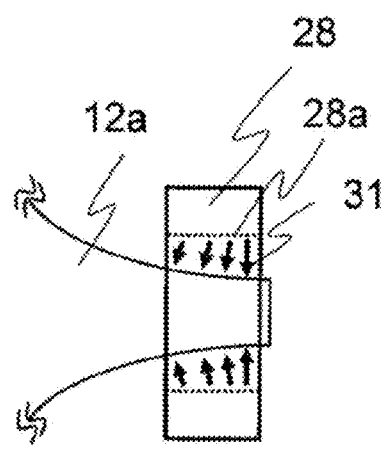
FIG. 7 is a schematic view illustrating an end portion of a horn of an ultrasonic sealing apparatus, in which the horn end is cooled with a fluid, according to an embodiment of the present invention.

FIG. 7 is a schematic cross-sectional view of the end frame 28 of the frame portion and the horn end portion 12a, in which the horn end portion 12a is cooled.

The fluid supplied into the end frame 28 is not limited to air (compressed air), but may be an inert gas or the like. Alternatively, the fluid may be water or some other liquid that serves the function.

The frame portion 26 includes stoppers 29. As shown in FIG. 6, the stoppers 29 are provided on a surface of the end frame 28 so as to face the anvil 13 and protrude toward the anvil 13 side. The end positions of the stoppers 29 are ensured to be closer to the anvil 13 than is the end position of the end portion 12a of the horn 12. In FIG. 6, the stoppers 29 are laterally paired and ensured to have the same amount of protrusion.

Further, at least the surface of the end portion 12a of the horn 12 has been subjected to a water repellent treatment.

The following description addresses the advantageous effects and the like exerted by the configuration of the ultrasonic sealing apparatus of the present embodiment will be described.

During the ultrasonic sealing, the air 31 is blown from the end frame 28 of the frame portion 26 toward the horn end portion 12a. Accordingly, the end portion 12a of the horn 12 is constantly cooled during ultrasonic sealing, thereby achieving more stable sealing with ultrasonic vibrations.

Since the horn 12, particularly the end portion 12a, has been subjected to a water repellent treatment, the water repellent treatment, being synergistically coupled with the air 31 blown from the frame portion 26, can at least actively remove the liquid contents adhered to the horn end portion 12a and the dirt such as paper dust, generated when cutting the packaging material. The blown air 31 also acts as an air curtain.

In this regard, provision of the frame portion, that is, formation of a space between the casing 25 and the end frame 28 as shown in FIG. 6 makes the horn end portion 12a visible. This facilitates visual recognition of the dirt adhered to the horn 12.

Conventional horns require periodical cleaning of adhered substances, and usually need to be cleaned by detaching the horn together with the casing. However, due to the provision of the frame portion, and in spite of the provision of the frame portion, the user of the apparatus of the present invention can easily access the horn end portion 12a without the need of removing the frame portion 26. Accordingly, the user can remove adhered substances with less workload.

Further, the end frame 28 of the frame portion 26 of the ultrasonic vibration generator is provided with the stoppers 29 for limiting the distance between the horn 12 and the anvil 13 to a given distance to prevent the horn 12 from being in direct contact with the anvil 13 when no tubular packaging material is interposed therebetween. The stoppers 29 prevent ultrasonic oscillation which would otherwise occur when the horn 12 and the anvil 13 are in direct contact with each other.

Although description has been given with reference to a limited number of embodiments, the scope of the invention is not limited thereto. Modifications of the above embodiments based on the above disclosure should be obvious to a person having ordinary skill in the art. That is, the present invention should not necessarily be limited to the aforementioned embodiments. Design modifications or the like can also be made to the above embodiments based on the knowledge of a person skilled in the art, and those modes which are applied with such modifications or the like should be encompassed by the scope of the present invention.

REFERENCE SIGNS LIST 101a, 101b . . . Laminate; 1 . . . Thermoplastic resin layer; 2 . . . Paper base material; 3 . . . Adhesive resin layer; 4 . . . Barrier layer; 4a . . . Vapor deposition film layer; 4c . . . Substrate film; 6 . . . Thermoplastic resin layer; 10 . . . Tubular packaging material; 11 . . . Liquid contents; 12 . . . Horn; 12a . . . Horn end portion; 13 . . . Anvil; 14 . . . Pressing mechanism section; 15 . . . Cutting blade; 16 . . . Processing section; 17 . . . Sheet-like packaging material; 19 . . . Raw material; 21 . . . Converter (Ultrasonic oscillator); 22 . . . Booster; 23 . . . Sealing bar; 24 . . . Ultrasonic generator; 25 . . . Casing; 26 . . . Frame portion; 27 . . . Rod-like member; 28 . . . End frame; 29 . . . Stopper; 30 . . . Fluid supply pipe; 31 . . . Air; 32 . . . Controlling section

What is claimed is:

1. An ultrasonic sealing apparatus for sealing of an overlapped portion by pressing a horn and an anvil against the overlapped portion from both sides, the overlapped portion being a portion where surfaces of a packaging material are so overlapped that thermoplastic resin layers face each other, wherein:
   the apparatus comprises the horn, the anvil and a frame portion;
   the horn is ultrasonically vibrated;
   the anvil presses the packaging material interposed between the horn and the anvil; and
   the frame portion comprises a hollow end frame which surrounds a periphery of an end portion of the horn; the end frame has an inner surface, which has an opening configured to blow a fluid to the end portion of the horn.

2. The ultrasonic sealing apparatus of claim 1, wherein:
   the frame portion includes a stopper provided on a surface of the end frame that faces the anvil; and,
   the stopper limits a distance between the horn and the anvil to prevent the horn and the anvil from being in direct contact with each other when the packaging material is not interposed between the horn and the anvil.

3. The ultrasonic sealing apparatus of claim 1, wherein a surface of the end portion of the horn is subjected to a water repellent treatment.

4. An ultrasonic sealing apparatus for sealing of an overlapped portion by pressing a horn and an anvil against the overlapped portion from both sides, the overlapped portion being a portion where surfaces of a packaging material are so overlapped that thermoplastic resin layers face each other, wherein:
   the apparatus comprises the horn, the anvil and a frame portion;
   the horn is ultrasonically vibrated;
   the anvil presses the packaging material interposed between the horn and the anvil; wherein
   the frame portion has a mechanism for blowing a fluid to an end portion of the horn and the frame portion includes a stopper provided on a surface of the frame portion that faces the anvil; and,
   the stopper limits a distance between the horn and the anvil to prevent the horn and the anvil from being in direct contact with each other when the packaging material is not interposed between the horn and the anvil.

5. The ultrasonic sealing apparatus of claim 4, wherein a surface of the end portion of the horn is subjected to a water repellent treatment.

* * * * *